(12) United States Patent
Oblak et al.

(10) Patent No.: US 8,439,067 B2
(45) Date of Patent: May 14, 2013

(54) KITCHEN MACHINE COMPRISING MEANS FOR DISCHARGING IMPURITIES

(75) Inventors: Aleksander Oblak, Recica ob Savinji (SI); Jurij Pesec, Slowenien (SI); Darko Rudez, Slowenien (SI)

(73) Assignee: BSH Bosch und Siemens Hausgeraete GmbH, Munich (DE)

(*) Notice: Subject to any disclaimer, the term of this patent is extended or adjusted under 35 U.S.C. 154(b) by 668 days.

(21) Appl. No.: 12/672,279

(22) PCT Filed: Jul. 30, 2008

(86) PCT No.: PCT/EP2008/059980
§ 371 (c)(1),
(2), (4) Date: Feb. 5, 2010

(87) PCT Pub. No.: WO2009/021844
PCT Pub. Date: Feb. 19, 2009

(65) Prior Publication Data
US 2011/0162733 A1 Jul. 7, 2011

(30) Foreign Application Priority Data
Aug. 14, 2007 (DE) .......................... 10 2007 038 350

(51) Int. Cl.
*B02C 18/12* (2006.01)
*B02C 18/16* (2006.01)
*B01F 7/20* (2006.01)

(52) U.S. Cl.
USPC .................. 137/377; 241/199.12; 241/282.2; 366/205; 366/206; 99/503

(58) Field of Classification Search .................. 137/357, 137/377; 241/199.12, 169.2, 282.1, 282.2, 241/285.3, 292.1; 366/129, 199, 205, 206, 366/314; 99/513
See application file for complete search history.

(56) References Cited

U.S. PATENT DOCUMENTS

| | | | |
|---|---|---|---|
| 2,822,485 A * | 2/1958 | Braun et al. .................. | 310/157 |
| 3,175,594 A | 3/1965 | Jepson et al. | |
| 3,220,450 A | 11/1965 | Aronson, II et al. | |
| 5,855,431 A | 1/1999 | Costanzo | |
| 6,640,693 B2 | 11/2003 | Brezovnik et al. | |
| 6,827,305 B2 * | 12/2004 | Brezovnik et al. ......... | 241/101.2 |
| 8,109,668 B2 * | 2/2012 | Garman et al. ............... | 366/205 |
| 2007/0140048 A1 | 6/2007 | Ismail | |
| 2008/0212403 A1 * | 9/2008 | Garman et al. ............... | 366/205 |
| 2008/0219089 A1 | 9/2008 | Sandford et al. | |

FOREIGN PATENT DOCUMENTS

| | | | |
|---|---|---|---|
| AT | 179392 B | 8/1954 | |
| DE | 20206403 U1 | 8/2002 | |

* cited by examiner

*Primary Examiner* — Craig Schneider
*Assistant Examiner* — Atif Chaudry
(74) *Attorney, Agent, or Firm* — James E. Howard; Andre Pallapies

(57) ABSTRACT

A kitchen machine having a housing that includes a housing base; a channel molded in a periphery of the housing and running in a direction of the housing base; a housing recess connected to the channel; and a coupling arranged in the housing recess to couple working apparatuses to the kitchen machine, wherein the housing recess includes means to discharge impurities.

8 Claims, 3 Drawing Sheets

Fig. 1
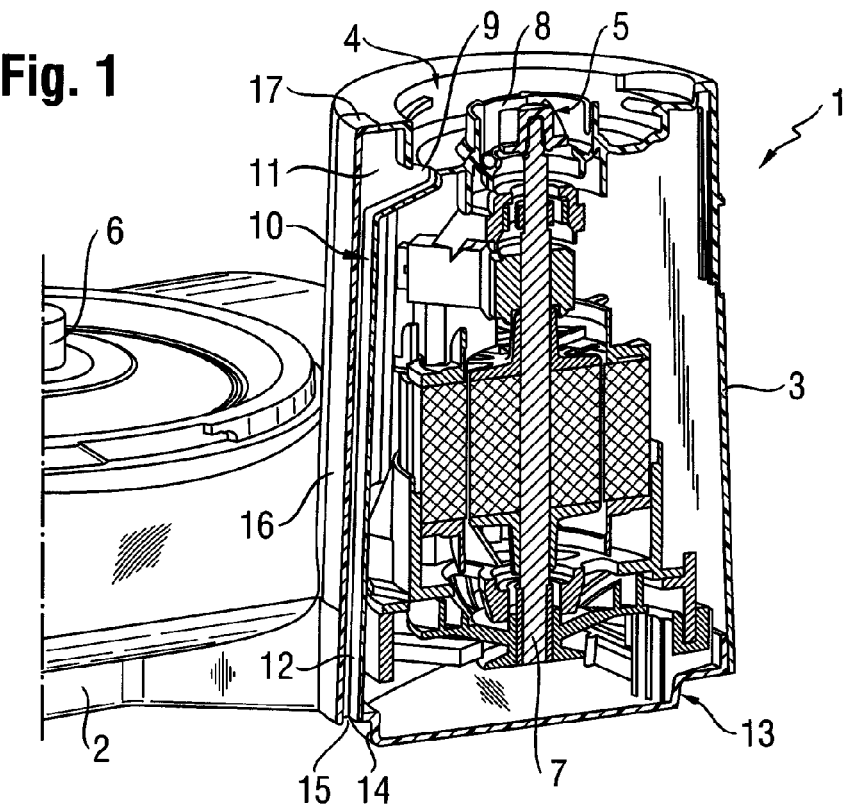
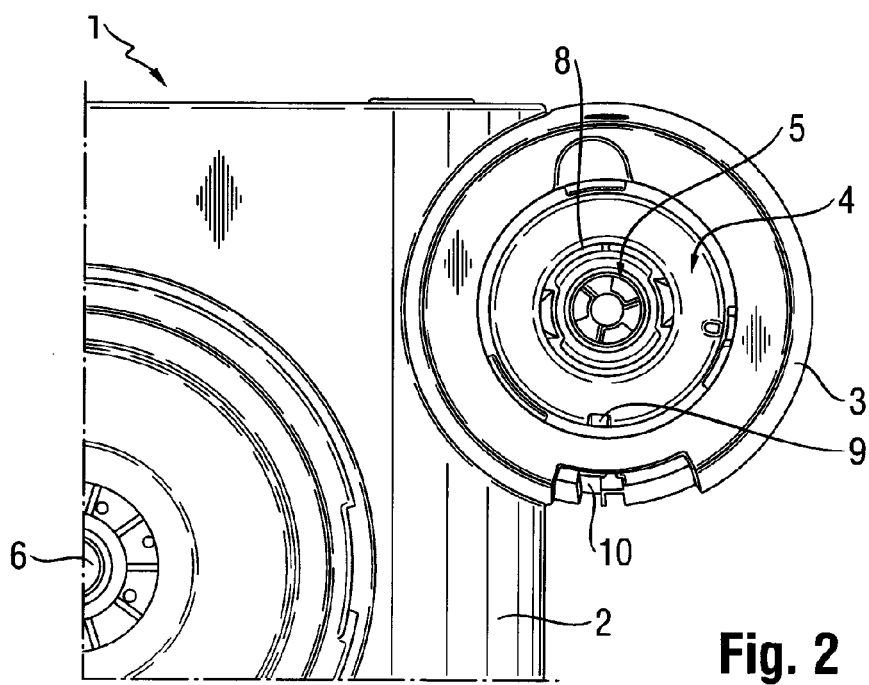
Fig. 2

KITCHEN MACHINE COMPRISING MEANS FOR DISCHARGING IMPURITIES

BACKGROUND OF THE INVENTION

The invention relates to a kitchen machine having a housing which comprises at least one coupling, which is arranged in a housing recess, for coupling working apparatuses, wherein the housing recess is provided with means for discharging impurities.

PRIOR ART

The publication DE 100 16 302 A1 discloses a kitchen machine having a housing, which comprises a first coupling for attaching a mixing container and a second coupling for attaching tools. The first coupling consists of the upper end of a vertically arranged drive shaft, which passes through the mixing container within a narrow, tower-like molding of the housing which protrudes from the housing base and is mounted in the cover of the mixing container. Laterally distanced therefrom, the housing is embodied in an elevated fashion overall and is equipped with a cylindrical housing recess in its upper region, from which housing recess a further drive shaft protrudes on a second coupling. The drive shafts run parallel to one another and are both driven by an electric motor which is located in the elevated part of the housing, with the speed of the drive shaft being reduced for the mixing container by means of a drive, relative to the speed of the drive shaft on the tool side.

With afore-cited kitchen machines of this type, impurities which are in particular liquid and flow downwards along the tools, can collect in the housing recess and cause malfunctions there.

Different excitations are known from practice in terms of discharging these impurities from the housing recess using the effects of gravity. According to a first suggestion, the housing recess is provided with a passage to the periphery of the housing, through which the impurities are routed outwards and then run downwards along the periphery of the housing. This embodiment is aesthetically displeasing and impedes operation of the kitchen machine as a result of the developing lubricating effect.

Another excitation provides for guiding a hose line from the housing recess through the interior of the housing to the housing base, by means of which the impurities are routed out of the kitchen machine. This solution increases the assembly outlay and thus the manufacturing costs of the kitchen machine. The cleaning of the hose line during subsequent operation of the kitchen machine is also complicated.

Furthermore, it is still known to allow impurities to leave the housing recess and easily enter the interior of the housing and to protect the electrical drive by means of a plastic hood. The impurities then collect unhygienically above the housing base in the interior of the housing.

BRIEF SUMMARY OF THE INVENTION

The object underlying the invention is to equip an afore-cited kitchen machine with means for discharging impurities out of the housing recesses, which are embodied in a structurally simple fashion, are pleasant on the eye and easy to clean.

INVENTIVE SOLUTION

The object is achieved in the case of a generic kitchen machine by the housing recess being connected to a channel molded to the periphery of the housing and running in the direction of the housing base.

Housings of this type are usually manufactured as complex injection-molded parts made of plastic. The channel contour can therefore be integrated into the relevant injection molded tool and is subsequently embodied in one piece with the housing. As the channel is accessible from the outside, it is possible, with minimal effort, to clean it by simply wiping, even if necessary in the case of an attached working apparatus.

PREFERRED EMBODIMENT OF THE INVENTION

Advantageous embodiments and developments, which can be used individually or in combination with one another, form the subject matter of the dependent claims.

The channel can preferably be covered with a screen, which is advantageously flush with the bordering peripheral area of the housing. If the relevant periphery of the housing is embodied so as to be arched, the screen is preferably embodied like a shell such that it extends the periphery of the housing.

According to a special embodiment of the invention, the screen can be detachably latched to the housing so that it is sufficiently secured during operation of the kitchen machine, so as to be able to clean the channel remotely and in a tool-free fashion. It is apparent that the screen is also preferably embodied such that it can be easily subjected to a corresponding cleaning process. For ease of cleaning and/or to facilitate the outflow of impurities during the operation, the surfaces of the channel and/or the screen in the region, in which they can come into contact with the impurities, are preferably embodied essentially flat.

The housing recess particularly advantageously has different depths, with the channel opening out of the lowest point of the housing recess. The housing recess is advantageously embodied such that a gradient is always present in the direction of this opening. The lowest point of the housing recess is preferably arranged here in the region of its outer periphery, as a result of which the path to the outside of the housing is shortened.

The channel has in particular a first channel section inclined downwards from the housing recess and directed radially outwards as well as a second channel section connecting thereto and directed vertically downwards. The second channel is preferably provided here across its entire length with a consistent cross-section and in particular does not have any narrow points. The opening of the second channel section is preferably arranged laterally in respect of a recess of the housing base. This embodiment of the invention enables impurities to be able to flow out onto the storage space of the kitchen machine.

The coupling preferably protrudes vertically upwards out of the housing recess and is surrounded by a molding of the housing recess which protrudes upwards in the manner of a flange. This molding can on the one hand protect the passage of the relevant drive shaft from impurities. It can also be used by molded brackets for the detachable fastening of different working apparatuses.

The invention can be used particularly advantageously in a kitchen machine, which comprises a first coupling, which is suited in particular for attachment of a mixing container and a second coupling provided at a distance therefrom for attaching tools, with the housing recess preferably being assigned to the last-cited coupling.

BRIEF DESCRIPTION OF THE DRAWINGS

The invention is described in further detail below with reference to schematic drawings with the aid of an exemplary embodiment, in which;

FIG. 1 shows a longitudinal section through the housing and housing recess of an inventively embodied kitchen machine along the channel which opens out of the housing recess and has an attached screen;

FIG. 2 shows a view onto the housing recess with a remote screen;

DETAILED DESCRIPTION OF EXEMPLARY EMBODIMENTS OF THE PRESENT INVENTION

Figure 3:
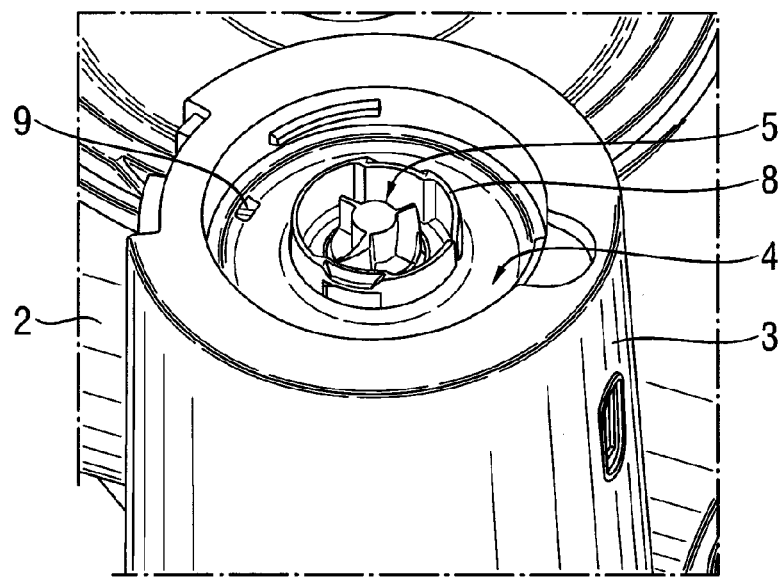
FIG. 3 shows a perspective view of the housing recess with a remote screen
Figure 4:
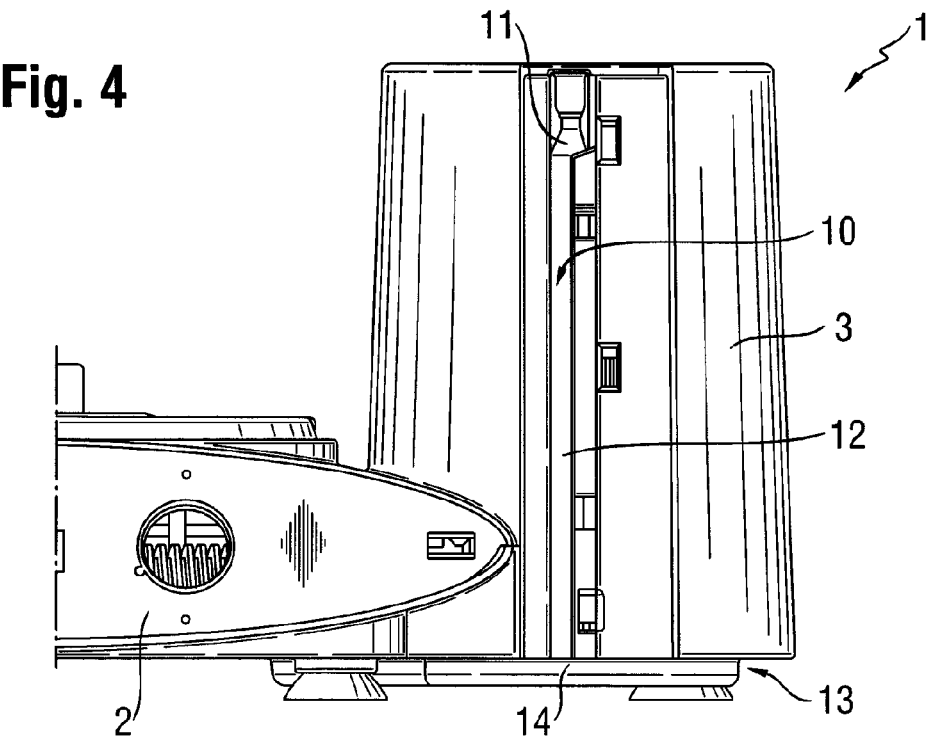
FIG. 4 shows a lateral view of the housing region provided with the channel with a remote screen.
Figure 5:
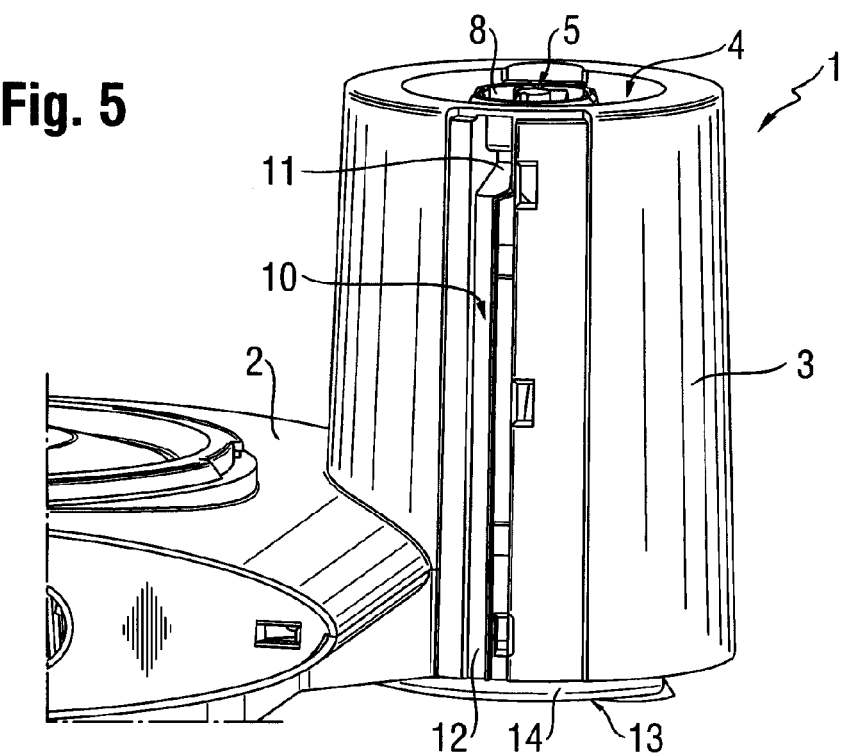
FIG. 5 shows a perspective view of the housing region according to FIG. 4.
Figure 6:
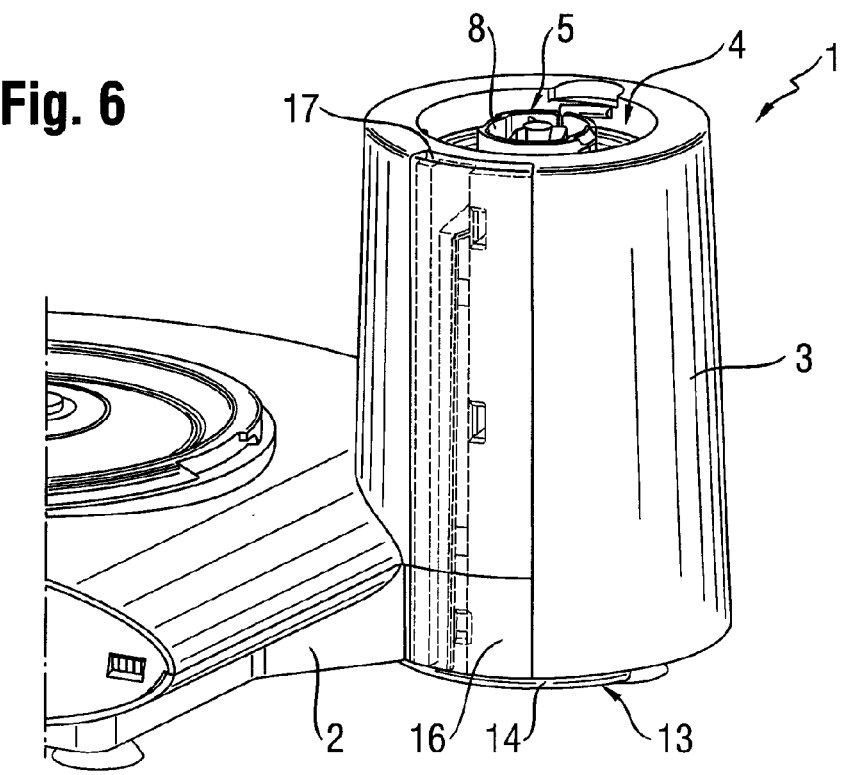
FIG. 6 shows a perspective view of the housing with an attached screen.

The extract of a kitchen machine 1 shown in the figures consists of a housing 2 with an elevation 3 running slightly conically upwards, which has a housing recess 4 on its topside comprising a coupling 5 for the mechanical active connection with selectable tools. A further, laterally offset coupling 6 for attaching a mixing container is only partially visible in the figures. The drive shaft 7 assigned to the coupling 5 and mounted so as to be vertically rotatable in the housing runs through the interior of the elevation 3, as apparent from the section according to FIG. 1. A molding 8 protruding upwards in the manner of a flange is provided coaxially to the coupling 5 in the housing recess 4.

The base of the essentially cylindrical housing recess 4 runs downwards from right to left in the representation according to FIG. 1 and has an opening 9 on its lowest, radially exterior point in a channel 10. The channel 10 consists of a first channel section 11, which connects the housing recess 4 to the outer periphery of the elevation 3 and a second channel section 12, which conveys the impurities from there downwards toward the base of the kitchen machine 1. The first channel section 11 leads downwardly inclined from the opening 9 in a radial direction. The second channel section 12 connecting thereto is directed vertically downwards and is open on its underside. The housing base 13 has a recess 14 either side of the channel 10 so that the opening 15 of the channel 10 is arranged elevated relative to the base of the kitchen machine 1. An unimpeded outflow of impurities is possible in this way.

The channel 10 is covered across the entire vertical extension of the elevation 3 with a shell-type screen 16, which has a bevel 17 for surrounding the upper edge of the elevation 3 and is detachably connected to the housing 2 by means of latching means. The screen is embodied here such that it continues the exterior surface of the housing 2 in a flush fashion. Viewed from the unavoidable separation joint, the screen 16 is thus invisibly inserted into the housing 3 and can however be manually removed in order to clean the channel 16.

The invention enables a structurally simple, at the same time hygienic and aesthetically pleasing discharge of impurities from the housing recess 4.

The features disclosed in the preceding description, the claims and the drawings can be useful both individually and also in any combination for the realization of the invention in terms of its different embodiments.

The invention claimed is:

1. A kitchen machine comprising a housing that includes a housing base;
   a channel molded in a periphery of the housing and running in a direction of the housing base;
   a housing recess connected to the channel; and
   a coupling arranged in the housing recess to couple working apparatuses to the kitchen machine, wherein the housing recess includes means to discharge impurities; and
   a screen detachably latched to the housing to cover the channel.

2. The kitchen machine of claim 1, wherein the screen is flush with a bordering peripheral area of the housing.

3. The kitchen machine of claim 1, wherein the housing recess has a molding that protrudes upwards in the manner of a flange; wherein the coupling projects vertically upwards from the housing recess; and wherein the coupling is surrounded by the molding.

4. The kitchen machine of claim 1, further comprising a first coupling and a second coupling arranged at a predetermined distance from the first coupling, the first coupling to attach a mixing container to the kitchen machine and the second coupling to attach tools to the kitchen machine.

5. The kitchen machine of claim 4, wherein the housing recess is assigned to the second coupling.

6. A kitchen machine comprising a housing that includes a housing base;
   a channel molded in a periphery of the housing and running in a direction of the housing base;
   a housing recess connected to the channel; and
   a coupling arranged in the housing recess to couple working apparatuses to the kitchen machine, wherein the housing recess includes means to discharge impurities, wherein the housing recess has a lowest point; wherein the housing recess has zones of different depths; and wherein the channel opens out of the lowest point of the housing recess,
   wherein the channel has a first channel section that is inclined downwards from the housing recess and directed radially outwards and a second channel section arranged next to the first channel section and directed vertically downwards, and wherein the second channel section has a uniform cross-section across the length of the second channel.

7. The kitchen machine of claim 6, wherein the lowest point is arranged in a predetermined region of an outer periphery of the housing recess.

8. The kitchen machine of claim 6, wherein the second channel section has an opening; wherein the housing base has a recess; and wherein the opening of the second channel section is arranged laterally to the recess of the housing base.

* * * * *